United States Patent [19]

Fujishiro et al.

[11] Patent Number: 5,705,446
[45] Date of Patent: Jan. 6, 1998

[54] WIDE ENDLESS BELT

[75] Inventors: Kazutoshi Fujishiro, Kakogawa; Yasuo Sumiyoshi; Masaaki Asazuma, both of Hyogo; Hiroshi Katsura, Akashi, all of Japan

[73] Assignee: Mitsuboshi Belting Ltd., Kobe, Japan

[21] Appl. No.: 259,516

[22] Filed: Jun. 14, 1994

[30] Foreign Application Priority Data

Jun. 18, 1993 [JP] Japan ............................ 5-172309
Apr. 21, 1994 [JP] Japan ............................ 6-107699

[51] Int. Cl.$^6$ .................... D03D 1/00; D03D 11/00; B32B 5/26
[52] U.S. Cl. ............... 442/260; 442/239; 442/255; 442/261; 442/289; 428/166; 428/168; 428/171; 428/172; 428/175; 428/402; 474/253; 474/258
[58] Field of Search ................... 428/156, 166, 428/168, 171, 172, 175, 240, 247, 252, 283, 822; 474/253, 258; 442/239, 255, 260, 261, 289

[56] References Cited

U.S. PATENT DOCUMENTS

| 1,536,533 | 5/1925 | Sheehan . |
|---|---|---|
| 2,597,284 | 5/1952 | Brown . |
| 3,190,137 | 6/1965 | Adams, Jr. . |

FOREIGN PATENT DOCUMENTS

| 0013471 | 7/1984 | European Pat. Off. . |
|---|---|---|
| 0133478 | 2/1985 | European Pat. Off. . |
| 3229813 | 2/1984 | Germany . |
| 2059343 | 4/1981 | United Kingdom . |

OTHER PUBLICATIONS

Rubber Products Manufacturing Technology, Bhowmick et al pp. 593–649.

*Primary Examiner*—Richard Weisberger
*Attorney, Agent, or Firm*—Wood, Phillips, VanSanten, Clark & Mortimer

[57] ABSTRACT

An endless belt having an inside surface, an outside surface, a length and a width. The belt has a canvas core layer, an elastomer layer outside of the canvas core layer, a surface canvas layer that is expansible lengthwise of the belt outside of the elastomer layer, and structure applied on the surface canvas layer and exposed on the outside surface of the endless belt to resist bonding of foreign material thereto.

38 Claims, 1 Drawing Sheet

WIDE ENDLESS BELT

BACKGROUND OF THE INVENTION

1. Field of the Invention

This invention relates to endless belts and, more particularly, to a wide belt that can be used to cooperate with a rotating toothed wheel on a corrugated board paper production line.

2. Background Art

In one known corrugated board paper producing apparatus, steam is used to heat a core paper to make it more pliable. The core paper is fed stepwise between a pair of toothed rollers which have meshed teeth that produce a uniform, undulating pattern for the core paper. Starch paste is applied on the crests of the formed core paper. In a separate line, the coated, formed core paper is mated with a liner paper which is fed to a press machine, which has cooperating rollers and a heat resistant backing belt. The formed core paper and liner paper are then bonded together to define a completed sheet which can be formed as desired. Because the formation of the core paper, bonding of the core and liner paper, and sheet forming steps are separately carried out, this type of system is generally relatively inefficient.

To simplify the above system, and enhance production efficiency, it is known to combine in a single procedure the steps of forming the core paper with the cooperating toothed rolls, pressing the formed paper through a toothed wheel against a backing belt, and bonding the formed core paper to a liner paper.

One modified form of corrugated board paper producing apparatus is shown schematically at 10 in FIG. 3. A core paper 12 is fed continuously between a pair of cooperating rolls 14, 16. The rolls 14, 16 have equidistantly spaced, peripheral teeth 18, 20, which are meshed as the rolls 14, 16 rotate about their respective, parallel axes 22, 24. The meshing teeth 18,20 produce corrugations in the core paper 12.

A coating mechanism 26 applies a starch paste to the crests 28 on the formed core paper 12 as it is advanced in the direction of the arrow 30.

The corrugated core paper 12 is continuously applied to a liner paper 32, advancing in the direction of the arrow 34, at a station 36. At the station 36, a wide belt 40 is trained around a pair of spaced rollers 42, 44. At the station 36, heat is applied to the corrugated core paper 12 from a source 46 through at least one of the rollers 42, 44, the belt 40 and roll 16. The heat vaporizes water absorbed by the corrugated core paper 12.

The rollers 42, 44 are situated so that the teeth 20 on the roll 16 bear against the outside surface 48 of the belt 40, over a substantial circumferential extent, as the system operates. The teeth 20 maintain the proper registration of the corrugated core paper web as it is advanced. At the same time, the roll 16 firmly presses the side of the core paper 12 with the paste thereon against the liner paper 32 to effect bonding therebetween. The corrugated core paper with the liner paper 32 attached thereto exits as a completed product 50 from between the roll 16 and the roller 42.

The belt 40 in the above type of apparatus 10 is placed under severe operating conditions. Because heat is introduced to the system to vaporize moisture in the core paper 12, the belt 40 is required to operate in a high temperature environment. Further, the belt 40 remains in constant contact with teeth 20 on the roll 16 which are forcibly pressed thereagainst to develop the required bonding pressure between the core paper 12 and the liner paper 32. Still further, the belt 40 must be flexible yet have lengthwise strength and widthwise rigidity sufficient to prevent wrinkling, as may cause the belt to drift undesirably from side to side.

One proposed solution to the above problems has been to make the belt from steel. Steel belts are expensive. While the steel belt has good strength and rigidity, it is prone to fatigue from the repeated flexing that occurs in operation. If the steel belt fails, those in the vicinity of the belt may be injured. The failed steel belt may also damage the equipment on which it is mounted. Still further, incorporation of the steel belt into a system may require enlargement of the apparatus. Generally, conventional corrugated board paper producing apparatus using a wide steel belt have not met performance criteria, including high speed operation.

SUMMARY OF THE INVENTION

The present invention is specifically directed to overcoming the above enumerated problems in a novel and simple manner.

In one form of the invention, an endless belt has an inside surface, an outside surface, a length and a width. The belt has a canvas core layer, an elastomer layer outside of the canvas core layer, a surface canvas layer that is expansible lengthwise of the belt outside of the elastomer layer, and structure applied on the surface canvas layer and exposed on the outside surface of the endless belt to resist bonding of foreign material thereto.

The endless belt may have a width from 1200 to 3000 mm, with the thickness between the inside and outside surfaces of the belt being no greater than 3.5 mm.

The belt so constructed has good flexibility. Since the above components are non-metal, failure of the belt does not pose a serious threat of injury to those in the vicinity of the belt. Further, the failure of the belt is not likely to result in damage to the equipment, on which it is mounted, or surrounding equipment. Still further, costs associated with the belt fabrication, as well as repair in the event of failure, are generally reduced over those associated with a counterpart steel belt.

The endless belt, by reason of its composition, is inherently less noisy than is a steel belt. Further, the inventive belt lends itself to high speed operation to allow for increased overall efficiency of the system with which it is associated, and particularly one adapted to continuously produce corrugated board paper. At the same time, the thinness of the belt allows it to remain in firm contact with a cooperating toothed roll, in a corrugated board paper producing apparatus, to allow vaporization of moisture in the corrugated paper board during fabrication.

In one form, the canvas core layer is seamless along both the entire length and width thereof.

In one form, the canvas core layer is defined by warp cords having a density of 10 to 50 cords/5 cm of belt width and weft cords having a density of 10 to 50 cords/5 cm of belt length. The density of cords is maintained within ±0.5 cords/5 cm throughout the entire length and width of the canvas core layer.

The warp cords may be made up of S direction cords and Z direction cords. In one form the warp cords are made up of S direction cords and Z direction cords alternatingly along the width of the belt.

Reinforcing fibers, which may be one of aromatic polyamide, cotton, and polyester, may be embedded in the elastomer layer, which fibers have a length of 2–20 mm and are present in an amount of 5–30 weight parts per 100 weight parts of a material in the elastomer layer.

In one form, the belt has a strength of at least 400 kgf/cm of belt width.

In one form, the belt has an elastic coefficient in the lengthwise direction of at least 8000 kgf/cm of belt width at a temperature range between 23° and 150° C.

In one form, the elongation of the belt is less than 2.5% at 23° C. and less than 4.0% at 150° C. under a load of 50 kgf/cm of belt width.

The ratio between the lengthwise elastic coefficient and the widthwise elastic coefficient may be between 0.7 and 1.5.

With the above construction, the belt maintains the necessary rigidity, particularly along its width, and has good heat resistance. The seamless construction prevents surface unevenness along the entire length and the width of the belt. This contributes to smooth running and a smooth and consistent bonding between board paper layers during operation of a corrugated board paper producing apparatus into which the belt is incorporated. In spite of the thinness of the belt, the above construction avoids wrinkle formation in the belt during running. As a result, the belt not only runs smoothly but has little tendency to drift in the lateral direction. It is thus possible with the above construction to press the core paper firmly into the liner in producing corrugated board paper.

Preferably, the outside surface of the belt has a hardness of at least 90° (JIS.A) to prevent penetration of the belt surface by toothed rolls pressed thereagainst under high pressure.

The short fibers in the elastomer layer enhance the rigidity of the belt along the width thereof. As noted, this is desirable in light of the thinness of the belt and its natural tendency at this thickness to wrinkle, which would interfere with smooth operation and consistent bonding between layers of corrugated board paper.

With the above construction, the belt elongation proves to be small, even in the high temperature environment encountered in producing corrugated board paper.

In one form, the structure applied on the surface canvas layer is a coating and may be a blend of an elastomer with powdered fluorine plastic. The coating may be on the order of 0.01–0.5 mm thick.

In one form, at least one of the elastomer layer and the elastomer in the coating is a heat resistant elastomer that is at least one of robber and synthetic resin that is in mm at least one of a) hydrogenated nitrile robber, b) styrene butadiene rubber, c) ethylene propylene robber, d) butyl robber, e) fluororubber, and f) polytetra fluoroethylene.

The fluorine plastic may be present in an amount of 300 to 1000 parts per 100 parts of elastomer.

The fluorine plastic is at least one of 4-ethylene fluoride, 3-ethylene fluoride, 2-ethylene fluoride, and a fluorine plastic having a melting point below 200° C. which is melted at the vulcanization temperature of the elastomer.

The coating may be applied in an mount of 100 to 500 g/m².

The coating has an excellent resistance to adhesion by foreign matter. In corrugated board paper manufacturing processes, a large amount of paste is used. In the absence of a coating, there is a tendency of this paste to adhere to the surface of the belt, which may damage the belt and/or effect a buildup thereon. This buildup may inhibit smooth operation of the system. Even if the paste adheres to the coating, it can be easily wiped off. Accordingly, maintenance of the belt is facilitated, whereby a high quality product can be consistently produced.

Various other preferred belt components and parameters are set out below to produce a high quality, highly durable and efficiently performing belt.

In one form, the canvas core layer is woven from at least one of aromatic polyamide fiber thread and polyether ether ketone fiber thread. The aromatic polyamide fiber is at least one of a) para base aramid fibers that include fibers that are sold under at least one of the commercial names TWARON™, KEVLAR™ and TECHNORA™, and b) meta base aramid fibers that include fibers that are sold under at least one of the commercial names CORNEX® and NOMEX®.

The warp and weft cords in the canvas core layer may be woven by one of a) plain weaving, b) mat weaving, c) twilling, and d) satin weaving.

At least one of the warp and weft cords in the canvas core layer may be defined by fiber filaments combined to produce yarns having a denier of 1000 to 2000, with at least one of the warp and weft cords defined by 2 to 10 yarns, which may be twisted 50 to 100 times per meter.

The surface canvas layer can be one of a) plain woven, b) twilled, and c) satin weave canvas.

The surface canvas layer is defined by warp and weft cords, with the warp cords defined by a blended thread including aromatic polyamide fiber and urethane elastic fiber. The weft cords in the surface canvas layer can be made from at least one of a) aromatic polyamide fiber thread, b) nylon fiber thread, and c) polyester fiber thread.

The surface canvas layer can be knitted fabric made from aromatic polyamide fiber thread.

The at least one of the warp and weft cords on the surface canvas layer can be defined by a) 1–3 twisted threads of 100–300 denier made from para base aramid fiber and b) Number 20–40 spun yarn defined by 1–4 twisted threads made from meta base aramid fiber. Threads of the warp cords can be blended with urethane elastic fiber thread having a denier of 140 per thread with there being 100–140 threads per 5 cm.

At least one of the nylon fiber thread and polyester fiber thread in the weft cords in the surface canvas layer has a denier of 100–300, with there being 1–3 twisted threads of the at least one of the nylon fiber thread and polyester fiber thread in the weft cords.

Urethane elastic fiber thread of approximately 140 denier can be blended with the at least one of the nylon fiber thread and polyester fiber thread, with there being 70–100 threads per 5 cm in the weft cords.

The elastomer layer may be one of a rubber and synthetic resin including at least one of styrene butadiene rubber, ethylene propylene rubber, butyl rubber, fluororubber, hydrogenated nitrile rubber and polytetra fluoroethylene.

Preferably, the outside surface of the belt has a coefficient of friction of less than 0.3 with respect to iron.

In one form, the surface canvas layer and the canvas cover layer abut directly to the elastomer layer.

The invention contemplates the endless belt in combination with a plurality of rollers around which the belt is trained, with there further being structure for heating at least one of the belt and at least one of the rollers.

The invention further contemplates the endless belt in combination with a plurality of rollers around which the belt is trained and a cylindrical roll having radially projecting teeth, with the cylindrical roll mounted relative to the belt so that the cylindrical roll can be rotated to press the teeth against the outside surface of the belt.

The invention further contemplates the combination of a) a cylindrical roll having radially projecting teeth, b) an endless belt having an inside surface, an outside surface, a length and width, a canvas core layer, and an elastomer layer, c) structure for mounting the endless belt for movement in a predetermined path, and d) structure for mounting the cylindrical roll in relation to the endless belt so that as the cylindrical roll rotates about its axis, the teeth on the cylindrical roll engage the outside surface of the endless belt.

DETAILED DESCRIPTION OF THE DRAWINGS

Figure 1:
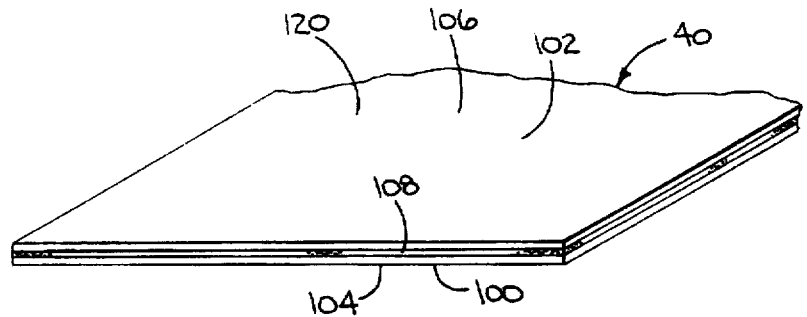
FIG. 1 is a perspective view of a portion of an endless belt according to the present invention.
Figure 2:
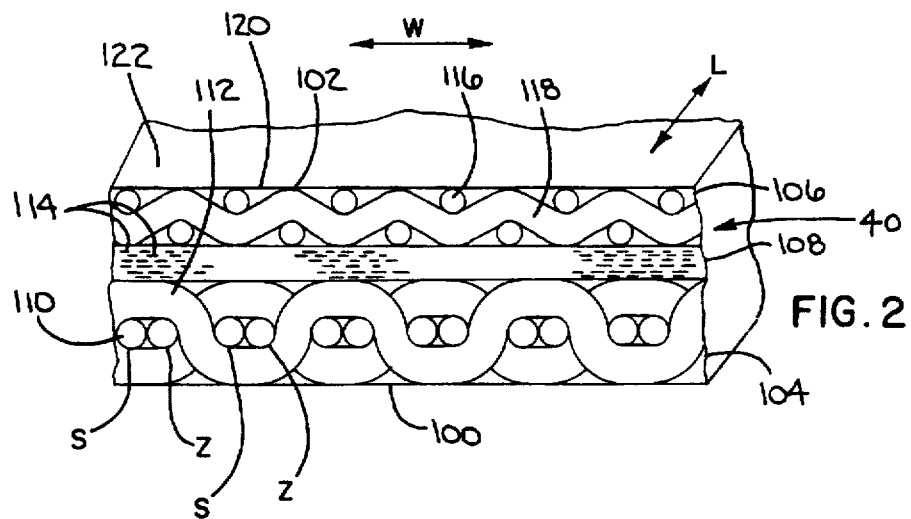
FIG. 2 is an enlarged, cross-sectional view of the belt in FIG. 1.

In FIGS. 1 and 2, an endless belt, according to the present invention, is shown at 40. The belt 40 has an inside surface 100, an outside surface 102, a length (L), and a width (W). While the belt construction, described herein, may have other applications, it is particularly suitable for use as a component of a board paper processing apparatus, such as that shown at 10 in FIG. 3, and previously described.

The belt 40 is significantly wider than it is thick, and preferably at least 340 times wider than it is thick. For example, the belt may be about 1200–3000 mm wide, with a thickness of less than 3.5 mm. This assures good heat conduction, which is desirable to allow heat transfer from the heat source 46 to and through the belt 40 to the core paper 12. It is desirable to make the belt 40 thin so that it has good flexibility and can be maintained in contact with a significant circumferential extent of the toothed roll 16, which engages therewith.

The belt 40 is shown to have three layers—a canvas core layer 104 on the inside of the belt 40, a surface canvas layer 106 on the outside of the belt 40, and an elastomer layer 108 between and abutting to each of the layers 104, 106.

The canvas core layer 104 is made of a woven canvas having high strength and resistance to elongation. In a preferred form, the canvas core layer 104 is made from aromatic polyamide fiber thread (aramid fiber) or polyether ether ketone fiber thread and is woven in the form of a cylinder. The canvas core layer 104 is made seamless and of uniform construction and thickness along its entire length and width.

More particularly, the canvas core layer 104 is defined by bundling or wrapping long fibers of filaments made from the aforementioned materials to produce yarns having a denier of 1000–2000. Two to ten of the yarns are woven to produce cords by plain weaving, mat weaving, twilling, or satin weaving. The yarns are preferably twisted 50–100 times per meter.

The canvas core layer 104 has warp cords 110, extending lengthwise of the belt 40, and weft cords 112 extending widthwise of the belt 40. The warp and weft cords 110, 112 have a density of 10–50 cords per 5 cm. The density in the number of cords is maintained within ±0.5 cords/5 cm throughout the entire width and length of the canvas core layer 104 to avoid localized variations in the elongation of the belt 40, so as to prevent premature belt failure due to concentrated stresses therein.

To prevent lateral drifting of the belt 40 during operation, the warp cords 110 have S direction cords and Z direction cords. Preferably, the warp cords are made up of S direction cords and Z direction cords alternatingly along the width of the belt.

The elastomer layer 108 is made from rubber or synthetic resin which may be styrene butadiene rubber, ethylene propylene rubber, butyl rubber, fluororubber, hydrogenated nitrile rubber, or polytetra fluoroethylene. Short fibers 114 are embedded in the elastomer layer 108, as necessary, to produce the required reinforcement. The fibers 114 have a length of 2–20 mm and are made from material having excellent durability, such as aromatic polyamide fiber (aramid fiber), cotton fiber, or polyester fiber. The fibers 114 are preferably present in an amount of 5–30 weight parts of fiber per 100 weight parts of rubber or synthetic resin material.

The surface canvas layer 106 is extensible lengthwise of the belt 40 and is bonded to the outer surface of the heat resistant elastomer layer 108. The surface canvas layer 106 is plain woven, twilled or satin woven canvas. The canvas layer 106 includes warp cords 116 and weft cords 118. The warp cords 116 are made from a blended thread of aromatic polyamide fiber (para base aramid fiber or meta base aramid fiber) and urethane elastic fiber. The weft cords 118 are made from aromatic polyamide fiber thread, nylon fiber thread, or polyester fiber thread. The canvas layer 106 can be a knitted canvas made of aromatic polyamide fiber thread.

The warp cords 116, in the para base aramid fiber thread, have 1–3 twisted threads of 100–300 denier. In the case of meta base aramid fiber thread, Number 20–40 spun yarn is used, with 1–4 twisted threads, blended with urethane elastic fiber thread of 140 denier per thread. The thread count is 100–140 per 5 cm.

For the weft cord 118, in the case of para base aramid fiber thread, 1–3 twisted threads of 100–300 denier are used. In the case of meta base aramid fiber thread, Number 20–40 spun yarn is used, with there being 1–4 twisted threads. In the case of nylon fiber thread or polyester fiber thread, 1–3 threads of 100–300 denier are wrapped. The thread count is 70–100 per 5 cm.

The warp cord 116 utilizes elastic fiber threads so that the elongation is more than 100% when the belt is cut and stretched.

The aromatic polyamide fiber which defines at least part of the canvas core layer 104 and surface canvas layer 106 is either para base or meta base. The para base aramid fiber (poly-para-phenylene isopthalamide) includes fibers sold under the commercial names TWARON™(brand name of Enka), KEVLAR™(brand name of DuPont), and TECHNORA™(brand name of Teijin). The meta base aramid fiber (polymetal-phenylene isopthalamide) includes fibers sold under the commercial names CORNEX™(brand name of Teijin) and NOMEX™(brand name of DuPont).

When a 2/2 twilled canvas is used as the surface cover layer 106, the canvas is vibrated in water after weaving, whereupon it will contract to ½ to ⅔ its woven width. The canvas is thereafter stretched to be incorporated into the belt 40. As a result, the surface cover layer 106 deforms the same amount as the other belt components during running and flexing, to prevent peeling of the surface cover layer 106 from the other belt components.

The surface cover layer 106 is bonded to the remaining components by dip processing in RFL, or is coated with an elastomer. The outer belt surface 120 is then covered with a coating layer 122 which resists bonding of foreign material to the surface 120. The coating layer 122 is formed by blending an elastomer, such as used in the layer 108, with a powdered fluorine plastic and applying that to the surface cover layer 106 to a thickness of approximately 0.01–0.5 mm.

The heat resistant elastomer, with which the powder is blended, may be a rubber or synthetic resin which is one of hydrogenated nitrile rubber, styrene butadiene rubber, ethylene propylene rubber, butyl rubber, fluororubber, or polytetra fluoroethylene.

The fluorine plastic may be 4-ethylene fluoride, 3-ethylene fluoride, or 2-ethylene fluoride. It is desirable to use a fluorine plastic having a melting point below 200° C. which is melted at the valcanization temperature of the heat resistant elastomer.

The coating layer 122 may be formed by mixing elastomer and fluorine plastic, which is melted by solvent to obtain a starch paste. Alternatively, the elastomer can be melted by a solvent and then mixed with powdered fluorine plastic. In any event, while the mixture appears as a paste, the fluorine plastic does not dissolve but remains suspended in a powdered condition in the blend.

The fluorine plastic is preferably present in the range of 300–1000 parts per 100 parts of elastomer.

The paste-like mixture is then coated on the surface 120 of the surface canvas layer 106 preferably in an mount in the range of 100–500 g/m² after drying.

The powdered fluorine plastic adheres to the surface 120 of the surface canvas layer 106 through the melted elastomer. The bonding between the elastomer and the surface canvas layer 106 is enhanced after vulcanization of the belt. A large amount of fluorine plastic adheres to the surface 120 of the surface canvas layer 106 by reason of the elastomer which acts as a bonding agent and allows the fluorine plastic to resist bonding of foreign material to the surface 120.

The coating 122 also enhances the rigidity of the belt. Preferably, the hardness of the belt surface is maintained at 90° (JIS.A) or more.

The coating 122 is formed preferably using the same material as is in the elastomer layer 108 so that the coefficient of friction between the belt 40 and iron is less than 0.3. Deformation of the belt by the roller 16 is thereby reduced to a desired extent.

With the above construction, the belt 40 is capable of withstanding a load during belt running under severe operating conditions, as are encountered in a typical board paper processing system. A belt strength of more than 400 kgf/cm of belt width is desired. The elastic coefficient of the belt along the running direction is at least 8000 kgf/1 cm of belt width with temperatures of 23° C. to 150° C.

To withstand the severe operating conditions in the board paper processing environment, i.e. to resist load and minimize elongation, elongation is maintained at less than 2.5% at 23° C. and less than 4.0% at 150° C. for a 50 kgf load/1 cm of belt width.

To prevent twisting and wrinkling of the belt in operation, the ratio between the lengthwise elastic coefficient and the widthwise elastic coefficient for the belt is between 0.7 and 1.5. This gives good widthwise belt rigidity.

Figure 3:
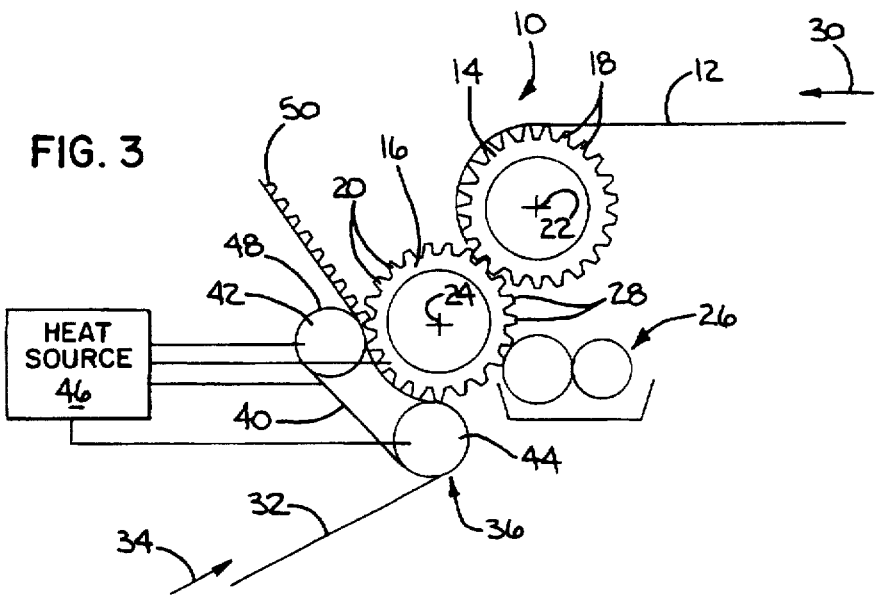
FIG. 3 is a perspective view of a corrugated board paper processing apparatus with the belt in FIGS. 1 and 2 incorporated therein.

With the belt 40 operating in the system in FIG. 3, the rollers 42, 44 can be heated by the source 46. Water in the core paper 12 is vaporized by heat conducted from the rollers 42, 44 through the belt 40, which may reach 160° C.

The system in FIG. 3 can operate with the inventive belt at 400 meters per minute. The hardness of the surface canvas layer 106 is chosen so that a high pressure can be applied by the roll 16 to the belt 40 without penetrating the surface thereof sufficiently to sever the core and liner papers 12, 32.

The foregoing disclosure of specific embodiments is intended to be illustrative of the broad concepts comprehended by the invention.

We claim:

1. An endless belt having an inside surface, an outside surface, a length, and a width, said endless belt comprising:
   a canvas core layer;
   an elastomer layer outside of the canvas core layer;
   a surface canvas layer that is expansible lengthwise of the belt outside of the elastomer layer; and
   means applied on the surface canvas layer and exposed on the outside surface of the endless belt to resist bonding of foreign material thereto.

2. The endless belt according to claim 1 wherein the belt width is 1200 to 3000 mm and the thickness between the inside and outside surfaces of the belt is less than 3.5 mm.

3. The endless belt according to claim 1 wherein the canvas core layer is seamless along the length thereof.

4. The endless belt according to claim 1 wherein the canvas core layer is seamless along the width thereof.

5. The endless belt according to claim 1 wherein the canvas core layer is woven from at least one of a) aromatic polyamide fiber thread and b) polyether ether ketone fiber thread.

6. The endless belt according to claim 1 wherein the canvas core layer is defined by warp cords having a density of 10–50 cords per 5 cm of belt width and weft cords having a density of 10–50 cords per 5 cm of belt length.

7. The endless belt according to claim 6 wherein the density of cords is within ±0.5 cords/5 cm throughout the entire length and width of the canvas core layer.

8. The endless belt according to claim 6 wherein the warp and weft cords are woven by one of a) plain weaving, b) mat weaving, c) twilling, and d) satin weaving.

9. The endless belt according to claim 6 wherein at least one of the warp and weft cords is defined by fiber filaments combined to produce yarns having a denier of 1000–2000, with the at least one of the warp and weft cords defined by 2–10 yarns.

10. The endless belt according to claim 9 wherein the yarns are twisted 50–100 times/m.

11. The endless belt according to claim 9 wherein there are warp cords that are made up of S direction cords and Z direction cords.

12. The endless belt according to claim 11 wherein the warp cords are made up of S direction cords and Z direction cords alternatingly along the width of the belt.

13. The endless belt according to claim 1 wherein the surface canvas layer is one of a) plain woven, b) twilled, and c) satin weave canvas.

14. The endless belt according to claim 1 wherein the surface canvas layer is defined by warp and weft cords and the warp cords are defined by a blended thread including aromatic polyamide fiber and urethane elastic fiber.

15. The endless belt according to claim 1 wherein the surface canvas layer is defined by warp and weft cords and the weft cords are made from at least one of a) aromatic polyamide fiber thread, b) nylon fiber thread, and c) polyester fiber thread.

16. The endless belt according to claim 1 wherein the surface canvas layer is a knitted fabric made from aromatic polyamide fiber thread.

17. The endless belt according to claim 1 wherein the surface canvas layer is defined by warp and weft cords with at least one of the warp and weft cords defined by a) 1–3 twisted threads of 100–300 denier made from para base aramid fiber and b) Number 20–40 spun yarn defined by 1–4 twisted threads made from meta base aramid fiber.

18. The endless belt according to claim 17 wherein the threads of the warp cords are blended with urethane elastic fiber thread having a denier of 140 per thread with there being 100–140 threads per 5 cm.

19. The endless belt according to claim 15 wherein at least one of the nylon fiber thread and polyester fiber thread has a denier of 100–300, with there being 1–3 twisted threads of the at least one of the nylon fiber thread and polyester fiber thread in the weft cords.

20. The endless belt according to claim 19 wherein there is at least one of the nylon fiber thread and polyester fiber thread with there being 70–100 threads per 5 cm in the weft cords.

21. The endless belt according to claim 5 wherein the aromatic polyamide fiber is at least one of a) para base aramid fiber that includes fibers that are sold under at least one of the commercial names TWARON™, KEVLAR™, and TECHNORA™, and b) meta base aramid fiber that includes fibers that are sold under at least one of the commercial names CORNEX™ and NOMEX™.

22. The endless belt according to claim 1 wherein the elastomer layer comprises one of a rubber and synthetic resin.

23. The endless belt according to claim 22 wherein there are reinforcing fibers embedded in the elastomer layer, said reinforcing fibers having a length of 2–20 mm and being present in the elastomer layer in an amount of 5–30 weight parts per 100 weight parts of the one of rubber and synthetic resin.

24. The endless belt according to claim 23 wherein the reinforcing fibers are at least one of aromatic polyamide, cotton and polyester.

25. The endless belt according to claim 1 wherein the means applied on the surface canvas layer comprises a coating on the surface canvas layer.

26. The endless belt according to claim 25 wherein the coating is a blend of an elastomer with powdered fluorine plastic.

27. The endless belt according to claim 25 wherein the coating is approximately 0.01–0.5 mm thick.

28. The endless belt according to claim 26 wherein at least one of the elastomer layer and the elastomer in the coating is a heat resistant elastomer that is at least one of rubber and synthetic resin.

29. The endless belt according to claim 26 wherein the fluorine plastic is at least one of 4-ethylene fluoride, 3-ethylene fluoride, 2-ethylene fluoride, and a fluorine plastic having a melting point below 200° C. which is melted at the vulcanization temperature of the elastomer.

30. The endless belt according to claim 26 wherein the fluorine plastic is present in an amount of 300–1000 parts per 100 parts of elastomer.

31. The endless belt according to claim 26 wherein the coating is applied in an amount of 100–500 g/m$^2$.

32. The endless belt according to claim 1 wherein the outside surface of the belt has a coefficient of friction of less than 0.3 with respect to iron.

33. The endless belt according to claim 1 wherein the belt has a strength of at least 400 kgf/cm of belt width.

34. The endless belt according to claim 1 wherein the belt has an elastic coefficient in the lengthwise direction of at least 8000 kgf/cm of width at a temperature range of between 23° and 150° C.

35. The endless belt according to claim 1 wherein the creep elongation of the belt is less than 2.5% at 23° C. and less than 4.0% at 150° C. under a load of 50 kgf/cm of belt width.

36. The endless belt according to claim 1 wherein the ratio between the lengthwise elastic coefficient and the widthwise elastic coefficient for the belt is between 0.7 and 1.5.

37. The endless belt according to claim 1 wherein the elastomer layer comprises at least one of styrene butadiene rubber, ethylene propylene rubber, butyl rubber, fluororubber, hydrogenated nitrile rubber, and polytetra fluoroethylene.

38. The endless belt according to claim 26 wherein at least one of the elastomer layer and the elastomer in the coating is at least one of a) hydrogenated nitrile rubber, b) styrene butadiene rubber, c) ethylene propylene rubber, d) butyl rubber, e) fluororubber, and f) polytetra fluoroethylene.

* * * * *